UNITED STATES PATENT OFFICE.

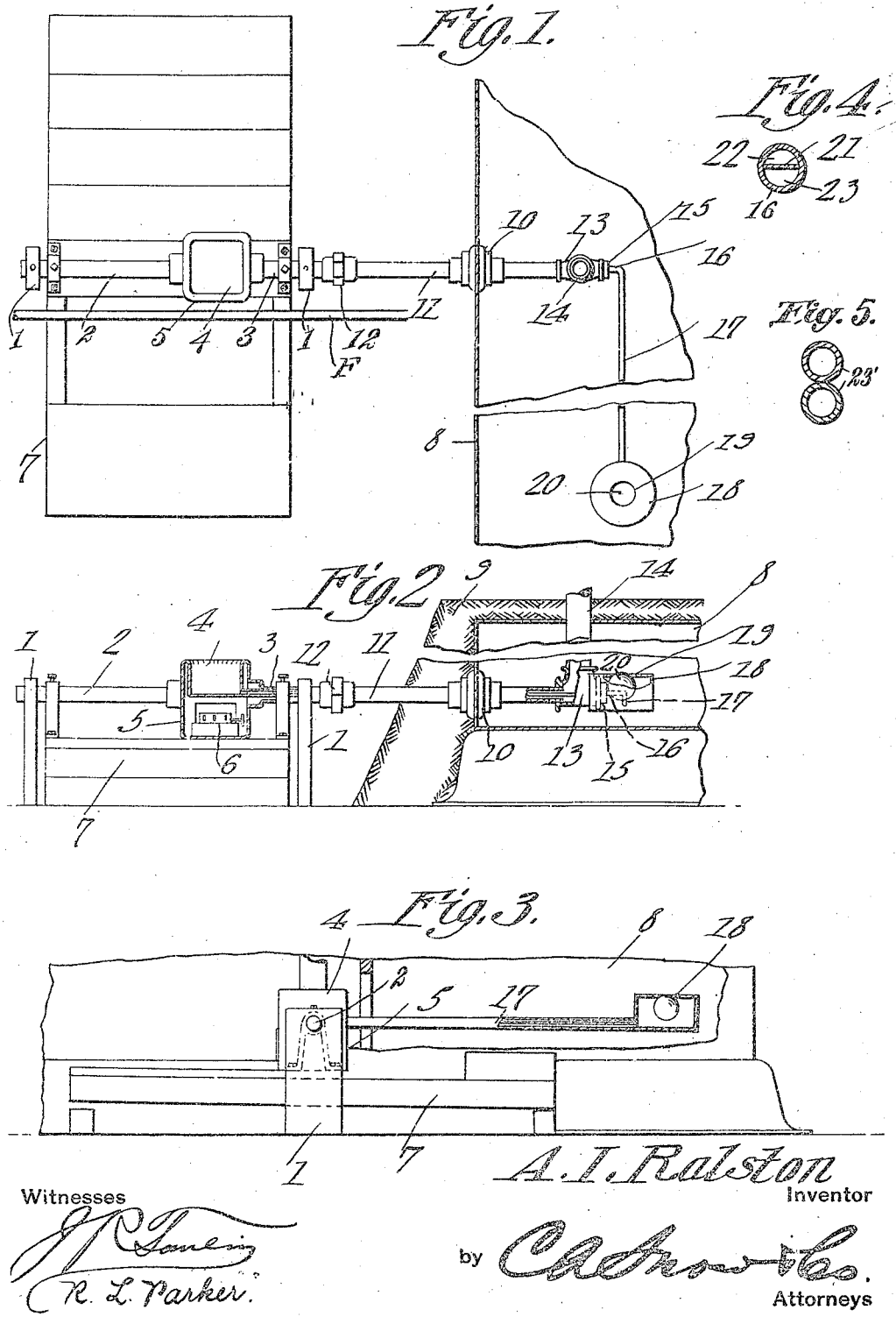

ALFRED I. RALSTON, OF WEEPING WATER, NEBRASKA.

STOCK-WATERING APPARATUS.

1,157,122.  Specification of Letters Patent.  Patented Oct. 19, 1915.

Application filed February 27, 1915. Serial No. 10,996.

*To all whom it may concern:*

Be it known that I, ALFRED I. RALSTON, a citizen of the United States, residing at Weeping Water, in the county of Cass and State of Nebraska, have invented a new and useful Stock-Watering Apparatus, of which the following is a specification.

This invention relates to apparatus for use in watering live stock, one of its objects being to provide a trough having means connected thereto whereby when an animal approaches the trough for the purpose of drinking, a supply of water will be directed automatically into the trough and the level of the water in said trough will be maintained practically constant, practically all of the water leaving the trough and draining back to the supply tank when the animal leaves the trough.

A further object is to combine means with the apparatus, whereby the water will be kept at a uniform temperature, thus to prevent freezing.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings, Figure 1 is a plan view of the apparatus constituting the present invention, only a portion of the supply tank being shown and said portion being illustrated in section. Fig. 2 is a view partly in front elevation and partly in section of the apparatus. Fig. 3 is a side elevation of the apparatus, the supply tank being broken away. Fig. 4 is an enlarged transverse section through the water pipe used in connection with the apparatus. Fig. 5 is a view similar to Fig. 4 and showing a modified pipe connection.

Referring to the figures by characters of reference 1 designates suitable supports in which pipe sections 2 and 3 are mounted for rotation, these sections being connected by a trough 4 under which is arranged a depending bracket 5 carrying a heater 6. This heater can be in the form of an oil lamp. A tiltable platform 7 is fixedly connected, adjacent its center, to the pipe sections 2 and 3, this platform being normally positioned with one end slightly elevated as shown particularly in Fig. 3. Thus it will be seen that when said end is depressed, as by an animal stepping on the platform, the pipe sections 2 and 3 will be given a slight rotation, the trough 4 moving with them.

A supply tank 8 is located adjacent the supports 1 and may be covered with dirt, manure, or any other protecting material indicated generally at 9, one wall of this supply tank or reservoir 8 being formed with a bushing 10 in which a pipe 11 is mounted for rotation, said pipe 11 being coupled, as at 12, to the pipe section 3. Obviously if preferred, pipe 11 and section 3 can be made in one piece, thus eliminating the coupling 12.

Pipe 11 projects any desired distance into the tank or reservoir 8 and is provided at its inner end with a T 13 from which projects an upwardly extending vent pipe 14 opening through the top of the tank or reservoir 8 and through the material covering said reservoir. A bushing 15 is arranged in one arm of the T and mounted for rotation in this bushing is a pipe 16. One end of this pipe is connected to the bottom portion of the trough 4 and that portion of the pipe extending beyond the pipe 11 and the bushing 15 is preferably bent at right angles, thus to form an arm 17 as shown in Figs. 1 and 3. The free end of the arm 17 opens into a receptacle 18 the top of which is provided with an opening 19 and this opening is adapted to be closed by a float valve 20. Pipe 16 is provided with a longitudinal partition 21 as shown in Fig. 4, this partition extending throughout the length of the pipe so that two passages are thus provided in the pipe, an upper passage 22 and a lower passage 23. If preferred, in lieu of providing a pipe of the special construction described, two superposed pipes 23' may be used as shown in Fig. 5.

The platform 7 is so mounted that it is normally overbalanced as shown in Fig. 3, this being due to the fact that that portion of the platform extending in one direction from the pivot of the platform is heavier than the remaining portion of the platform. This mounting of the platform also results in maintaining the receptacle 18 normally in a lowered position within the tank or reservoir 8. It is to be understood that the reservoir or tank 8 can be partly filled with water and this water will enter the receptacle 18 until the level of the water within this receptacle raises the valve 20 against its seat formed by the wall of opening 19 whereupon the further supply of water to the receptacle 18 will be cut off. When the receptacle 18 is in its normal position it is in a horizontal plane extending along or slightly above the bottom of the trough 4. As pipe 16 will also be full of water, it will be apparent that when the heater 6 is lighted, the hot products of combustion will flow along the pipe 3 to the vent 14 and thus raise the temperature of the water contained in the pipe 16 so that a circulation through the pipes, the receptacle 18, and over the bottom of the trough 4 will be set up. At the same time the water contained in the tank or reservoir 8 will be kept heated.

When an animal approaches the trough to drink from it, it must first place its weight on the elevated end of the platform 7, any suitable means, such as a fence F being provided for preventing the animal from stepping on the other or heavier end of the platform. When the lighter end of the platform is depressed, the trough 4 is not only slightly tilted but the pipe 16 is rotated so as to cause the arm 17 to swing upwardly, thus elevating the receptacle 18 so that the water contained therein will be free to flow into the trough 4. This elevation of the receptacle 18, however, is not such as will bring it above the trough 4 but merely to approximately the same level as the top of the trough. Therefore the water contained in the receptacle will gravitate into the trough but will not overflow it. As soon as the level of the water in the elevated receptacle 18 and the trough 4 rises to a certain plane, the float valve 20 will shut off the supply of water to receptacle 18 from the tank or reservoir 8 but, as the water is drawn from the trough 4, thus lowering the level of the water in said trough and in the receptacle 18, the float 20 will be free to fall thus admitting a fresh supply. However, the supply admitted will never be enough to cause the trough 4 to overflow. As soon as the animal leaves the platform 7, said platform will gravitate to its initial position, thus causing the various parts to return to their initial positions and any water contained in the trough 4 will tend to flow back into the receptacle 18. Should any water be left in the trough it will be kept warm by reason of the fact that the water will circulate in the manner hereinbefore set forth while the heater 6 is in use.

As was heretofore pointed out, the coupling 12 can be dispensed with if desired and the pipes 3 and 11 made integral. In this event, however, it would be necessary for the pipe 11 to be so connected to the T 13 as to permit it to rotate relative thereto. The coupling 12 not only serves to hold the pipe 11 to the section 3 but also permits the section 3 to have a slight rotation relative to the pipe 11.

It is to be understood of course that the structure herein described can be made in different sizes to suit different kinds of stock. Furthermore, if desired, the platform 7 may be dispensed with and the arm 17 can also be done away with, the receptacle 8 being placed at the end of the pipe 15 and in communication with pipe 16. With this form the water can be supplied continuously to the trough. Various other changes can likewise be made, the same being in the scope of the claims forming a part of this specification.

What is claimed is:—

1. The combination with a supply tank, of a trough, a tiltable platform adjacent the trough, a pipe discharging into the trough, said platform constituting means for rotating the pipe, one end portion of the pipe being extended radially to constitute an arm within the tank, a receptacle carried by the arm and having an inlet, and a valve within the receptacle for closing the inlet.

2. The combination with a tank, of a trough, a pipe mounted for rotation and discharging into the trough, said pipe having a radial arm formed at one end thereof, a receptacle carried by said arm and communicating therethrough with the trough, said receptacle having an inlet, a float valve for closing the inlet, the said receptacle being submerged within the contents of the tank, and normally located below the level of the trough, and stock operated means for rotating the pipe to raise the arm and receptacle above the bottom of the trough to supply the trough from the receptacle.

3. The combination with a trough and a tank, of a supply pipe extending from the tank to the trough and mounted for rotation, said pipe having one end portion extended radially to form an arm, a receptacle carried by the arm and having an inlet, a float valve for closing the inlet, said receptacle being normally located below the plane of the bottom of the trough, and stock operated means for rotating the pipe to lift the receptacle above the level of the bottom of the tank, said receptacle being constantly submerged within the contents of the tank.

4. The combination with a tank and a trough, of a pipe mounted for rotation and discharging into the trough, one end of the pipe being extended radially to form an arm within the tank, a receptacle carried by the arm and having an inlet in the top thereof, a float valve in the receptacle for closing the inlet, said receptacle being normally positioned below the plane of the bottom of the trough, a platform, and means operated by the platform when depressed, for rotating the pipe to elevate the receptacle above the plane of the bottom of the trough.

5. The combination with a tank and a trough, of separate water conductors for establishing communication between the tank and trough, said conductors being mounted for rotation and having one end extended radially to form an arm, a receptacle supported by the arm and in communication with the conductors, said receptacle having an inlet, a float valve within the receptacle for closing the inlet, said receptacle being normally located below the plane of the bottom of the trough and being constantly submerged by the contents of the tank, a heater below the trough, means for conveying hot products of combustion from the heater and along the conductors and through the tank, and stock operated means for rotating the conductors to elevate the receptacle above the plane of the bottom of the trough.

In testimony that I claim the foregoing as my own, I have hereto affixed my signature in the presence of two witnesses.

ALFRED I. RALSTON.

Witnesses:
H. D. REED,
E. B. TAYLOR.